Figure 1:
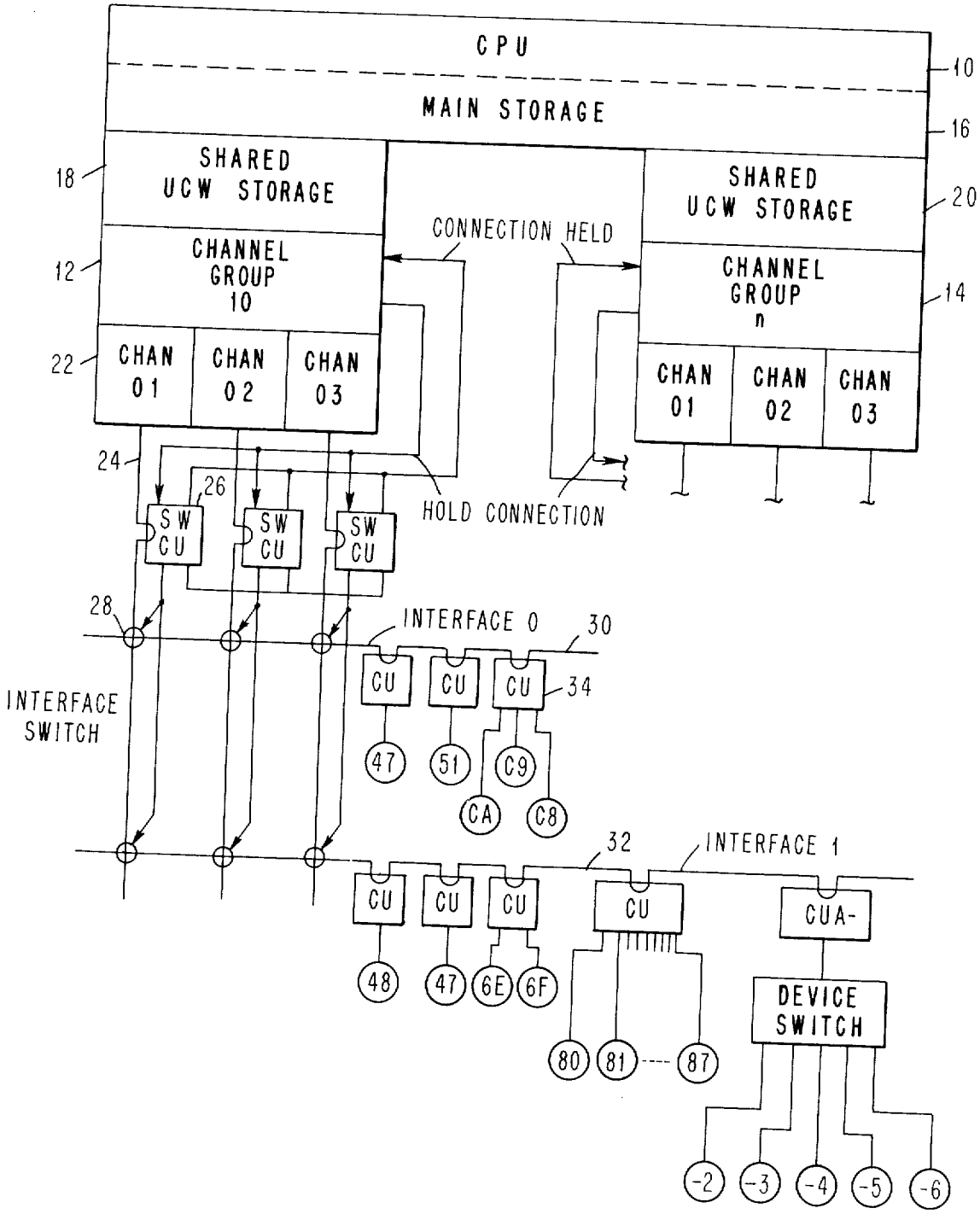
Figure 2:
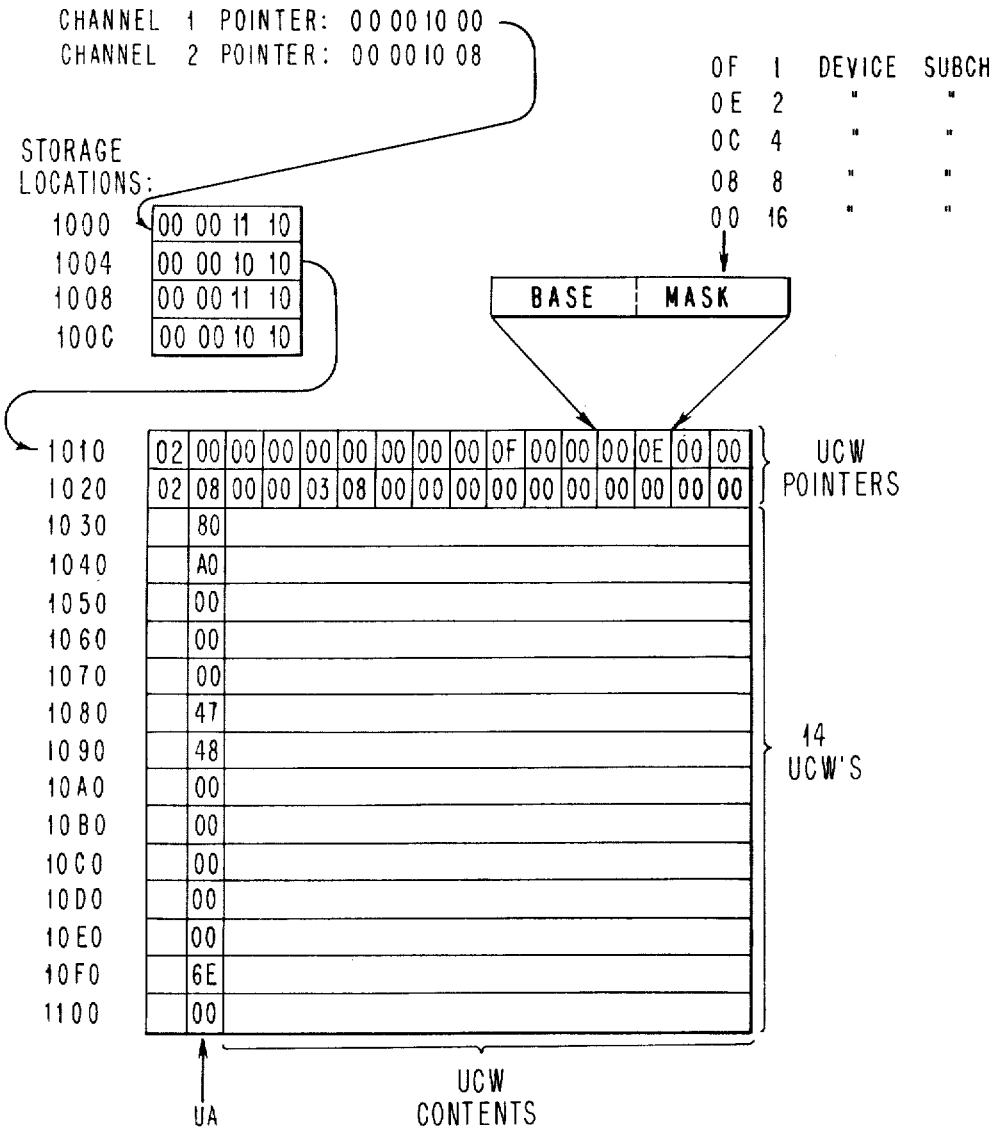
Figure 5:
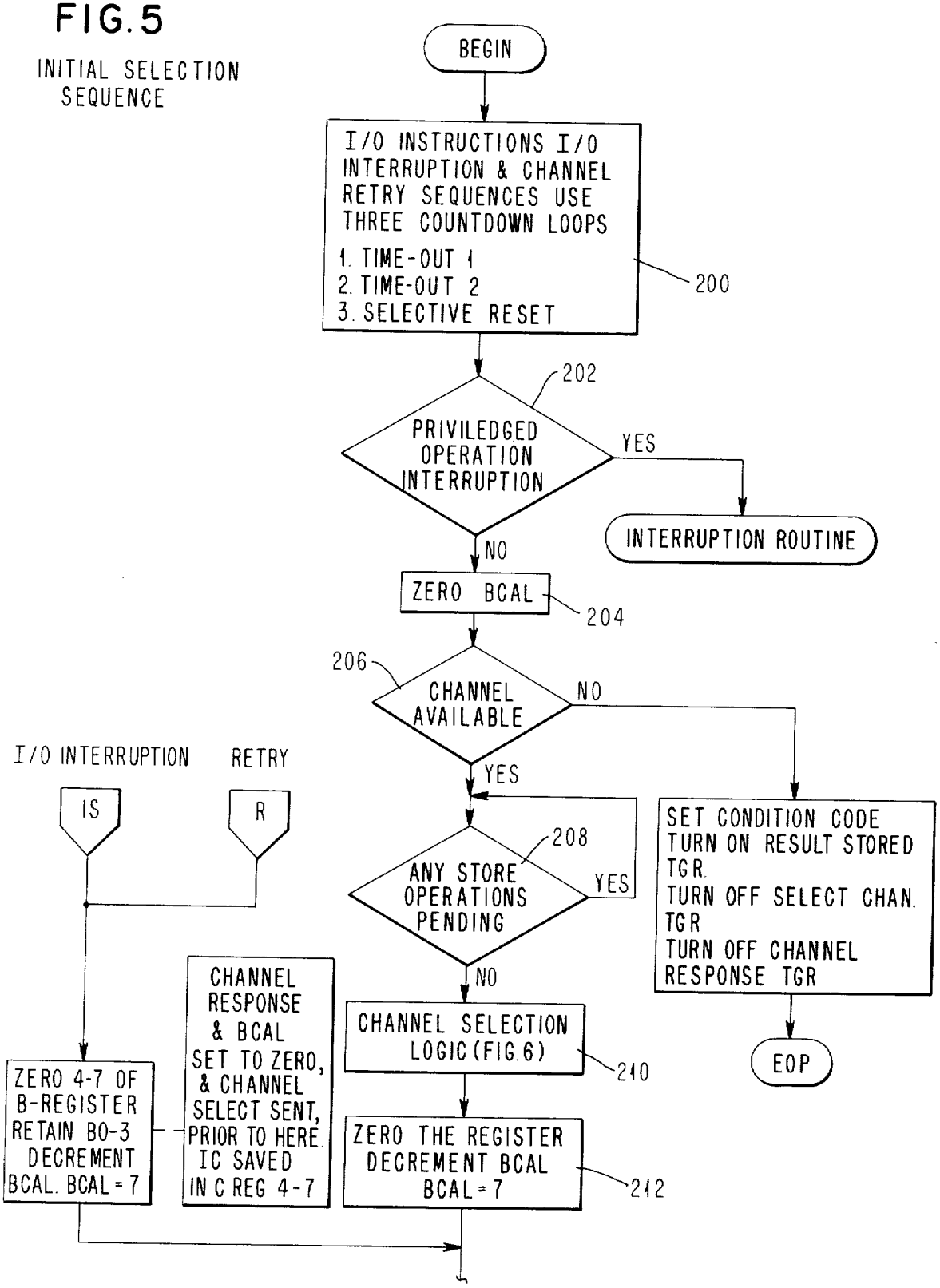
Figure 6:
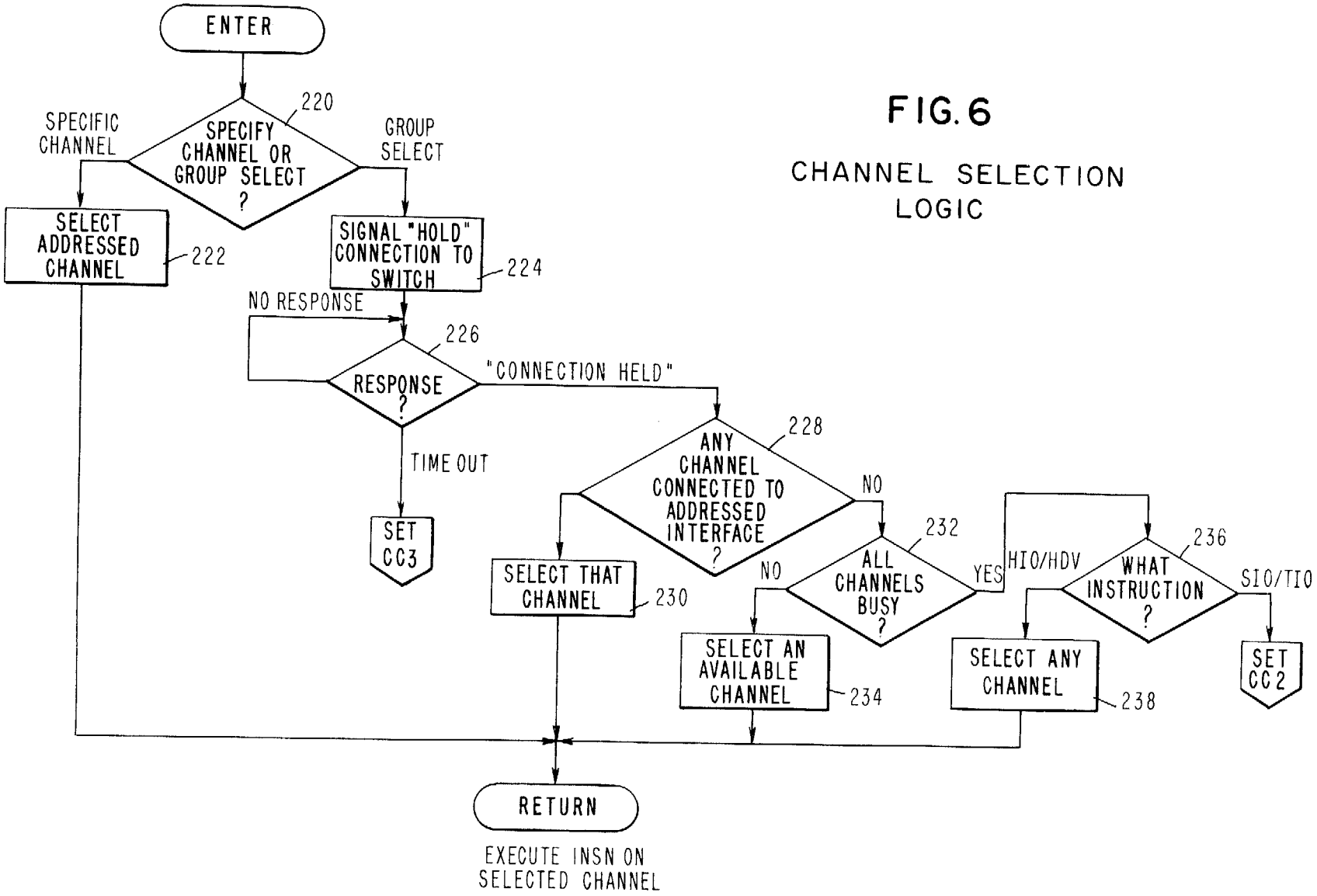
Figure 7:
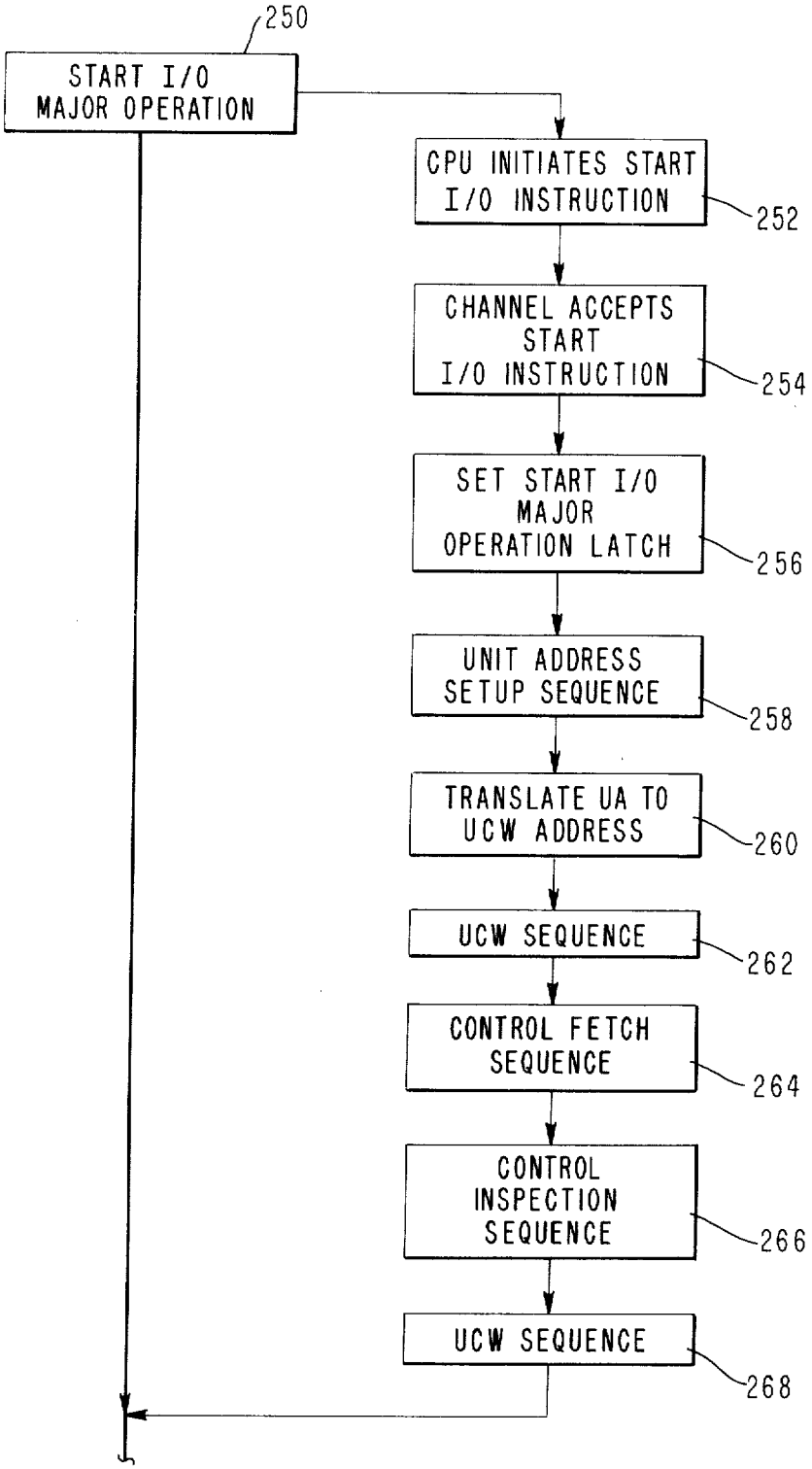

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 11

T940,021

INPUT/OUTPUT SYSTEM WITH CHANNEL GROUPS AND DYNAMIC SHARING OF I/O DEVICES

Paul J. Brown, Poughkeepsie, and Roger L. Carmier, Pleasant Valley, N.Y., assignors to International Business Machines Corporation, Armonk, N.Y.

Continuation of application Ser. No. 320,043, Jan. 2, 1973. This application June 24, 1974, Ser. No. 482,539

Int. Cl. G06f *3/00, 15/20*

U.S. Cl. 340—172.5

6 Sheets Drawing. 24 Pages Specification

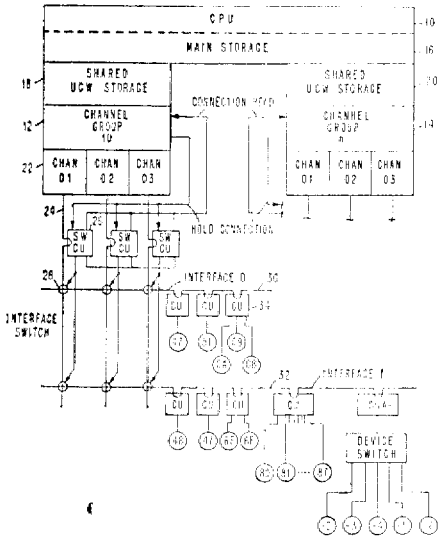

Apparatus for sharing input/output devices among a group of channels such that automatic path finding and dynamic sharing within the channel group is achieved. The system provides more efficient channel utilization with fewer system interruptions.

Any one channel of a group of similar channels, each of which has access to unit control words for a set of attached devices, performs I/O operations without program selection of a specific channel. With this type of an input/output system, a start I/O instruction specifies a channel group and a particular device so that any channel in the group that is not busy at the time the instruction is issued will execute the instruction.

Also disclosed is a unit control word structure that allows the number of unit control words assigned to a given I/O interface to be determined independently of the number of UCW's assigned to the other interfaces of the system. It also allows shared sub-channel assignment to be determined independently of the device address structure. The UCW structure also allows sharing of UCW sets among channels to accommodate interface sharing.

INTERFACE POINTERS AND UCW FOR INTERFACE 1

FIG. 3

UCWS FOR INTERFACE 0

| STORAGE LOCATIONS: | | | | | | | | | | | | | | | | |
|---|---|---|---|---|---|---|---|---|---|---|---|---|---|---|---|---|
| 1110 | 02 | 00 | 00 | 00 | 00 | 00 | 00 | 00 | 0F | 01 | 0F | 00 | 00 | 00 | 00 | 00 |
| 1120 | 00 | 00 | 00 | 00 | 00 | 00 | 00 | 00 | 0C | 00 | 00 | 00 | 00 | 00 | 00 | 00 |
| 1130 | | 51 | | | | | | | | | | | | | | |
| 1140 | | 00 | | | | | | | | | | | | | | |
| 1150 | | 00 | | | | | | | | | | | | | | |
| 1160 | | 00 | | | | | | | | | | | | | | |
| 1170 | | 00 | | | | | | | | | | | | | | |
| 1180 | | 47 | | | | | | | | | | | | | | |
| 1190 | | C8 | | | | | | | | | | | | | | |
| 11A0 | | 00 | | | | | | | | | | | | | | |
| 11B0 | | 00 | | | | | | | | | | | | | | |
| 1160 | | 00 | | | | | | | | | | | | | | |
| 11D0 | | 00 | | | | | | | | | | | | | | |
| 11E0 | | 00 | | | | | | | | | | | | | | |
| 11F0 | | 00 | | | | | | | | | | | | | | |
| 1200 | | 00 | | | | | | | | | | | | | | |
| 1210 | | 00 | | | | | | | | | | | | | | |

UA

FIG. 4

COMBINED UCW BLOCK

| STORAGE LOCATIONS: | |
|---|---|
| 1000 | 00 00 10 10 |
| 1004 | 00 00 10 30 |

CHANNEL 1 POINTER: 00001000
CHANNEL 2 POINTER: 00001000

| | | | | | | | | | | | | | | | | |
|---|---|---|---|---|---|---|---|---|---|---|---|---|---|---|---|---|
| 1010 | 04 | 00 | 00 | 00 | 00 | 00 | 00 | 00 | 00 | 0F | 03 | 0F | 00 | 00 | 00 | 00 |
| 1020 | 00 | 00 | 00 | 00 | 00 | 00 | 00 | 00 | 03 | 0C | 00 | 00 | 00 | 00 | 00 | 00 |
| 1030 | 02 | 00 | 00 | 00 | 00 | 00 | 00 | 00 | 00 | 0F | 00 | 00 | 00 | 0E | 00 | 00 |
| 1040 | 03 | 08 | 00 | 00 | 04 | 08 | 00 | 00 | 00 | 00 | 00 | 00 | 00 | 00 | 00 | 00 |
| 1050 | | 51 | | | | | | | | | | | | | | |
| 1060 | | 80 | | | | | | | | | | | | | | |
| 1070 | | 40 | | | | | | | | | | | | | | |
| 1080 | | 47 | | | | | | | | | | | | | | |
| 1090 | | 00 | | | | | | | | | | | | | | |
| 10A0 | | 47 | | | | | | | | | | | | | | |
| 10B0 | | 48 | | | | | | | | | | | | | | |
| 10C0 | | C8 | | | | | | | | | | | | | | |
| 10D0 | | 00 | | | | | | | | | | | | | | |
| 10E0 | | 00 | | | | | | | | | | | | | | |
| 10F0 | | 00 | | | | | | | | | | | | | | |
| 1100 | | 00 | | | | | | | | | | | | | | |
| 1110 | | 6E | | | | | | | | | | | | | | |
| 1120 | | 00 | | | | | | | | | | | | | | |
| 1130 | | 00 | | | | | | | | | | | | | | |

UA

INITIAL SELECTION SEQUENCE

CHANNEL SELECTION LOGIC